P. JENSEN.
CLAMP.
APPLICATION FILED DEC. 24, 1909.

977,802.

Patented Dec. 6, 1910.

Witnesses
E. W. Cressman.
Jas. E. Sproll.

Inventor
Peter Jensen

By Adams & Brooks
Attorneys

UNITED STATES PATENT OFFICE.

PETER JENSEN, OF BREMERTON, WASHINGTON.

CLAMP.

977,802.  Specification of Letters Patent.  Patented Dec. 6, 1910.

Application filed December 24, 1909. Serial No. 534,882.

*To all whom it may concern:*

Be it known that I, PETER JENSEN, a citizen of the United States of America, and a resident of the town of Bremerton, county of Kitsap, and State of Washington, have invented certain new and useful Improvements in Clamps, of which the following is a specification.

The present invention relates to clamp-screws or bench-clamps, and has for its object the provision of a simple and efficient implement embodying an angularly adjustable clamp screw provided with means for holding the same in position on a bench.

The invention resides in certain novel features in the combinations, constructions and arrangements of parts as set forth in the following description and defined in the claims.

Figure 1:
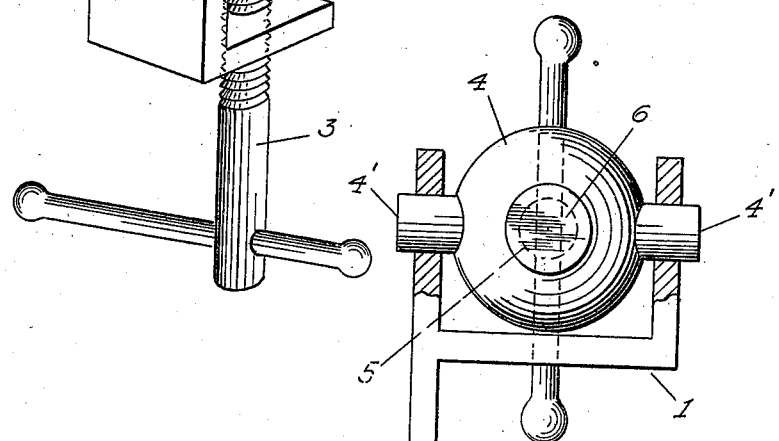

In the accompanying drawing, wherein like reference numerals designate corresponding parts throughout: Figure 1 is a front elevation of a clamping screw embodying the features of my invention in such form as now preferred by me, and Fig. 2 is a perspective of the same applied to a bench for use as a clamp-screw.

Figure 2:
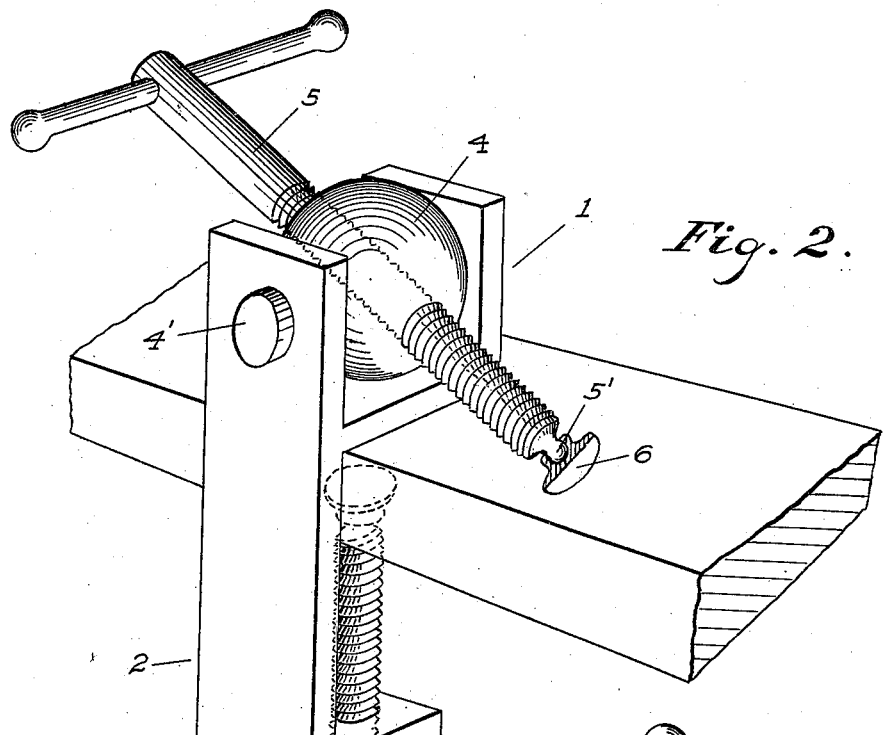

In the present embodiment I have combined a substantially U-shaped base 1 with an L-shaped bracket 2, the foot part of the latter extending beneath the base and carrying a clamping device 3 in the form of a hand screw which is seated in the foot part for adjustment relatively to the base to secure the latter in position, as shown in Fig. 2, for coaction therewith to hold down or clamp work as may be desired.

4 designates a nut which is preferably spherical in form and connected with base 1 by means of trunnions 4' which are secured to the nut and seated in suitable apertures provided in the stem portions of the base.

Engaged with nut 4 is a hand screw 5 having a spherical like termination 5' engaged in a correspondingly formed socket of a disk 6 adapted for engagement with the work. The screw 5 may be adjusted with nut 4 to various angular positions, as may be desired in applying the same to relatively thin or thick work with either jointed or beveled edges as will be readily understood.

Having thus described my invention, what I claim as new, and desire to secure by Letters Patent of the United States of America, is:

1. A device of the character described comprising a substantially L-shaped bracket, securing means mounted in the foot part of said bracket, a base from which said bracket depends opposed to said securing means, said base being U-shape and formed in its stem portions with seats, a nut part having trunnions engaged in the seats of said base, and a clamping screw engaged in said nut.

2. A device of the character described comprising a substantially L-shaped bracket, a clamping screw mounted in the foot part of said bracket, a base from which said bracket depends opposed to said screw, said base being U-shape and formed in its stem portions with seats, a nut part having trunnions engaged in the seats of said base, and a clamping screw engaged in said nut and adjustable therein laterally of said first screw.

Signed at Seattle, Washington this 15 day of December 1909.

PETER JENSEN.

Witnesses:
 A. N. BOOTH,
 FRANK E. ADAMS.